UNITED STATES PATENT OFFICE.

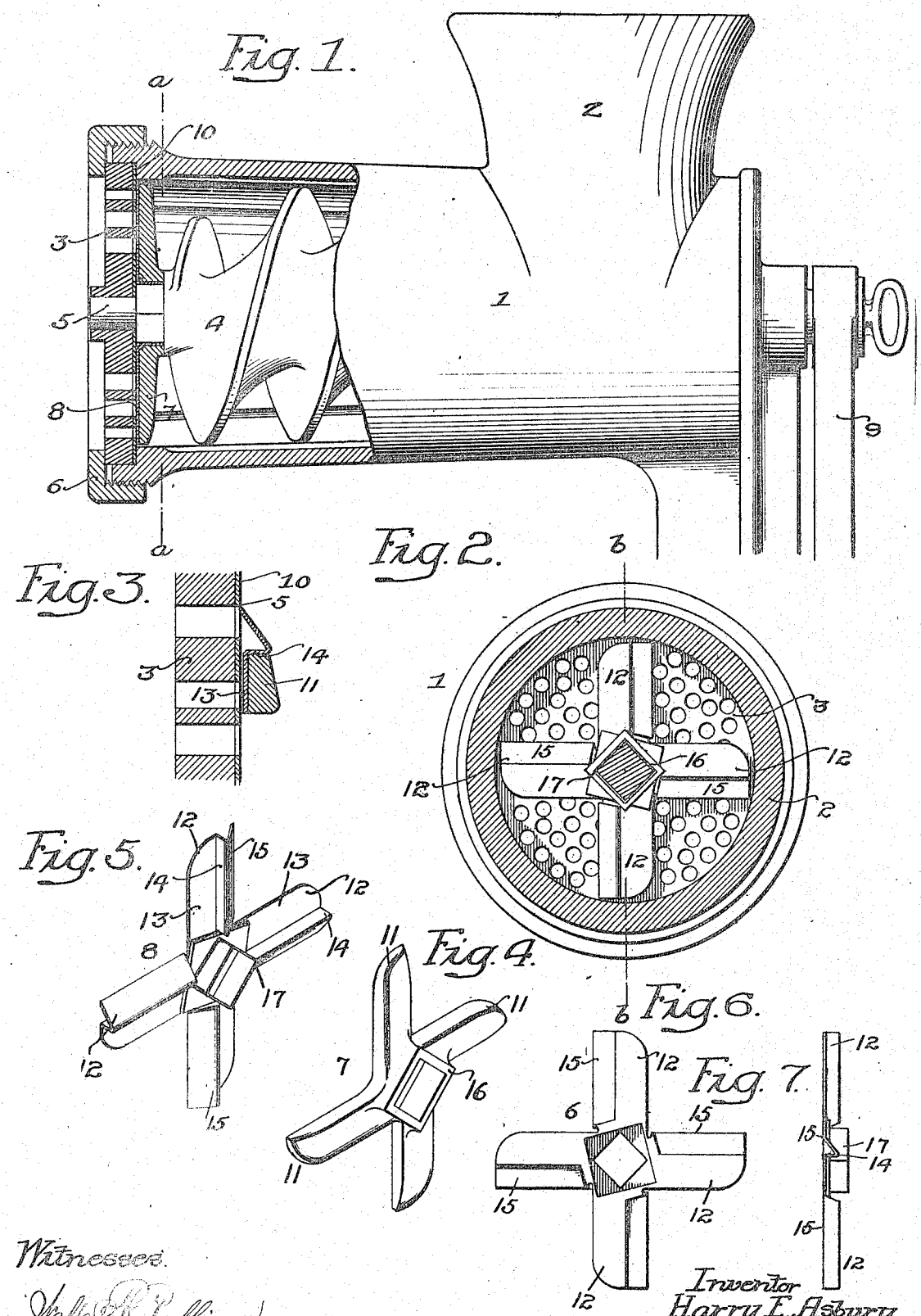

HARRY E. ASBURY, OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

CHOPPER.

1,122,055. Specification of Letters Patent. Patented Dec. 22, 1914.

Application filed January 20, 1914. Serial No. 813,292.

*To all whom it may concern:*

Be it known that I, HARRY E. ASBURY, a citizen of the United States, residing in Philadelphia, Pennsylvania, have invented certain Improvements in Choppers, of which the following is a specification.

My invention relates to certain improvements in knives for meat choppers in which the meat, or other material passing through the machine, is cut in small pieces by the action of a knife against a perforated plate through which the meat is forced by a feed screw or an equivalent appliance.

One object of my invention is to construct a meat chopper of this type with a blade which will have a yielding contact against the plate so that the meat will be cut more perfectly and uniformly than heretofore.

A further object of the invention is to provide a thin struck up sheet metal blade which is detachably held to a carrier so that the cutting edge of the blade will have a certain amount of elasticity to allow it to accommodate itself to the plate against which it travels.

A still further object of the invention is to make both cutting edges of thin sheet metal, one being pressed up into shape to form the blade and the other being punched to form the other cutting edge.

When it is necessary to replace the worn parts, these sheet metal elements can be removed and others substituted therefor, as in practice it has been found that the blades and plates should be arranged in pairs so as to accomplish perfect cutting.

In the accompanying drawing:—Figure 1, is a side view, partly in section, of a meat chopper of the type above described and illustrating my invention; Fig. 2, is a sectional view on the line $a$—$a$, Fig. 1; Fig. 3, is an enlarged sectional view on the line $b$—$b$, Fig. 2; Fig. 4, is a perspective view of the carrier; Fig. 5, is a perspective view of the knife blade; Fig. 6, is a face view of the blade; and Fig. 7, is an edge view of the blade.

Referring to the drawing, 1 is the body of the meat chopper having a hopper 2.

3 is the perforated supporting plate at one end of the body and having a bearing for the extension 5 of the feed screw 4. The plate is held to the body portion in the usual manner by a ring 6 screwed onto the body portion, as shown.

7 is the knife carrier and 8 is the knife. The carrier and knife are mounted on the squared portion of the screw 4, as illustrated in Fig. 2.

9 is a handle by which the screw, knife carrier and knife are rotated.

On the inside of the perforated plate and loosely secured thereto is a thin perforated sheet metal disk 10 forming the cutting surface against which the knife rotates. The carrier, in the present instance, has four arms 11 which are shaped as shown in Figs. 3 and 4. The knife has four blades 12, which may be shaped as shown in Figs. 3 and 5. The body portion 13 of each blade extends under the arms 11 of the carrier, as illustrated in Fig. 3, and is clear of the disk 10, and each blade is shouldered, as at 14, to fit against the forward end of the arm and has an extended cutting portion 15 which is beveled at the end and is in yielding contact with the perforated plate 10 so that the cutting portion will accommodate itself to any slight unevenness in said plate.

It will be noticed that this portion 15 of each blade is inclined and will force the uncut meat back and over the joint between the blade and the carrier, so as to prevent the meat from entering the space between the blade and the carrier. If the meat should enter between these two parts, then the knife and the screw will be jammed and the machine will work hard and unevenly.

The hub 16 of the carrier 7, in the present instance, is rectangular so as to fit over the rectangular portion of the extension 5 of the feed screw. The knife 8 has a hub 17, which is pressed up from the thin sheet metal and this hub extends into the hub 16 of the carrier when the two parts are placed together and, as the shoulders 14 fit against the forward edge of the arms 11 of the carrier, the knife must turn with the carrier, but each blade of the knife is independently flexible so as to accommodate itself to the surface of the thin flexible perforated plate 10.

By the above construction, it will be seen that I am enabled to make a meat chopper in which the knife and the perforated plate against which the knife acts are flexible so that both will yield, insuring cutting of the meat without tearing, and when it is necessary to replace the knife the thin perforated disk is also removed so that, in the event of one having a nick or groove in it, the cutting operation of the meat will not be affected.

By this invention there is no accurate finishing of the knife as where the blade is made of cast metal and unyielding. The same is true of the perforated plate. The sheet metal disk can be used without further finishing, which materially decreases the cost of manufacture.

While I have described my device as applied to a machine for cutting meat, it will be understood that it may be used for cutting other materials without departing from the essential features of the invention.

I claim:—

1. The combination in a meat cutter, of a perforated supporting disk; a thin flexible perforated disk supported by the first mentioned disk and prevented from turning independently of the first mentioned disk; a rotating feeding device; a carrier mounted thereon so as to turn therewith; and a flexible knife arranged to turn with the carrier and to bear against the flexible disk so that one will accommodate itself to the other as the knife and its carrier rotate.

2. The combination in a meat cutter, of a casing; a perforated plate secured to the casing; a feed screw mounted in the casing; means for turning the feed screw; a carrier mounted on the feed screw and arranged to turn therewith, said carrier having arms; a flexible sheet metal knife, also mounted on the feed screw, and engaged by the carrier so that it will turn therewith, said knife having a hub entering the hub of the carrier and having blades located between the carrier and the perforated plate, each blade having a flexible cutting portion extending beyond the arms of the carrier and bearing against the plate.

3. The combination in a meat cutter, of a casing; a perforated plate secured to the casing; means located within the casing for feeding the meat to the perforated plate; a rotating carrier having arms and located within the casing; a knife arranged to rotate with the carrier and having its cutting edges bearing against the plate, said knife having shouldered blades bearing against the front edge of each arm of the carrier so that the meat back of the knife will be prevented from entering the space between the blades and the arms of the carrier.

4. The combination in a meat chopper, of a casing; a perforated plate secured thereto; a feed screw mounted in the casing and having an extension; a carrier having arms and mounted on the extension of the feed screw and so arranged that it will turn with the feed screw; a thin flexible knife mounted between the carrier and the perforated plate, the carrier having arms and the knife having blades corresponding to the arms and having a shouldered projecting portion in front of each arm and also having an inclined surface for directing uncut meat clear of the space between the arms of the carrier and the blades, said portions being beveled to form a cutting edge which bears against the plate.

In testimony whereof, I have signed my name to this specification, in the presence of two subscribing witnesses.

HARRY E. ASBURY.

Witnesses:
CLYDE T. MOYER,
WM. A. BARR.